United States Patent
Ström et al.

(10) Patent No.: US 7,245,045 B2
(45) Date of Patent: Jul. 17, 2007

(54) T-FILTER FOR REDUCING DISTURBANCES GENERATED ON A POWER GRID BY AN ACTIVE FILTER

(75) Inventors: Peter Ström, Lund (SE); Dan Liljengren, Malmô (SE)

(73) Assignee: Comsys AB, Lund (SE)

( * ) Notice: Subject to any disclaimer, the term of this patent is extended or adjusted under 35 U.S.C. 154(b) by 0 days.

(21) Appl. No.: 10/490,016

(22) PCT Filed: Sep. 18, 2002

(86) PCT No.: PCT/SE02/01685

§ 371 (c)(1), (2), (4) Date: Oct. 8, 2004

(87) PCT Pub. No.: WO03/026094

PCT Pub. Date: Mar. 27, 2003

(65) Prior Publication Data

US 2005/0040219 A1    Feb. 24, 2005

(30) Foreign Application Priority Data

Sep. 18, 2001    (SE) .................................... 0103098

(51) Int. Cl.
H02M 1/12    (2006.01)
(52) U.S. Cl. ...................... 307/105; 323/209
(58) Field of Classification Search ............. 307/105; 327/553, 552; 323/207, 209
See application file for complete search history.

(56) References Cited

U.S. PATENT DOCUMENTS

| | | | |
|---|---|---|---|
| 4,812,669 A | * | 3/1989 | Takeda et al. ............ 307/105 |
| 5,321,598 A | * | 6/1994 | Moran ..................... 363/41 |
| 5,465,203 A | * | 11/1995 | Bhattacharya et al. ...... 363/40 |
| 5,648,894 A | | 7/1997 | DeDoncker et al. |
| 5,731,965 A | | 3/1998 | Cheng et al. |
| 7,091,704 B2 | * | 8/2006 | Chou et al. ............. 323/207 |

FOREIGN PATENT DOCUMENTS

DE    19738125    3/1999

OTHER PUBLICATIONS

Simplified Modern Filter Design, Philiph Geffe, John F. Rider Publisher, Inc., New York, 1963, pp. 117, 130, 131 and 145.*

"Active Filter Solutions For Utility Interface Of Industrial Loads", Subhashish Bhattachara et al, Power Electronics Drives And Energy Systems For Industrial Growth, pp. 1078-1084, vol. 2, 1996.

* cited by examiner

*Primary Examiner*—Shawn Riley
(74) *Attorney, Agent, or Firm*—Boyle, Fredrickson, Newholm, Stein & Gratz, S.C.

(57) ABSTRACT

An active filter (4) for compensation of variations in an apparatus' (3) current consumption from a power grid (1) as a cause of variations in the apparatus electrical load, through active frequency filtering and dynamic compensation of reactive energy/current. For each of the power grid's phases (a, b, c) the active filter includes a transistor bridge (Ta, Tb, Tc) connected between each phase and a DC-link (7). The active filter includes a filter circuit of LCL-type, arranged to reduce disturbances on the power grid caused by the active filter itself. The active filter further includes a control device (9) for calculating, with a given working frequency (f), points in time at which the transistor bridges are set to reverse the current direction through the DC-link, and the filter circuit is preferably adjusted to that working frequency.

12 Claims, 1 Drawing Sheet

T-FILTER FOR REDUCING DISTURBANCES GENERATED ON A POWER GRID BY AN ACTIVE FILTER

AREA OF THE INVENTION

The present invention relates to active filters for suppression of disturbances and energy savings at the power supply of electrical apparatuses. More exactly the invention relates to compensation of currents introduced by the active filter itself.

BACKGROUND

A load giving the least possible losses in relation to its performed work in an electrical system is a load with purely resistive impedance. However, in most cases the impedance of the load an electrical apparatus constitutes almost always contains an inductive or capacitive component, which means that the current consumed from the feeding grid not always will be in phase with the source voltage. Furthermore, many electrical apparatus comprises active components that have a dynamically varying load, i.e. the load varies with time. Such electrical apparatus includes among others the types of apparatus converting electrical power to work, such as cranes or workshop machines. It is obvious that for example a sheet press device has an increased current consumption during active press duty than when the device is only idling. Common for this type of apparatuses is that they comprise a dynamic power supply. Furthermore, in many cases the dynamics are unpredictable, in the sense that the load changes have an uneven or indeed random periodicity, or impedance that varies in strength over time. For such processes, calculation and averaging of the current consumption can as a rule not be utilized in a satisfactory way in order to compensate the load changes. A consequence of such load behaviours is that current transients is formed in the power grid causing to a certain extent increased current consumption depending on energy content, and mainly causing problems for other sensitive equipment connected to the power grid.

In order to solve the problem with the influence of dynamic loads on the power grid so called active filters have been developed, adapted for compensating load variations. An active filter is in principle a microprocessor controlled amplifier which is connected to the power grid, and which is arranged to sense and compensate the load's current consumption in regard to frequencies which would not exist if the load was purely resistive. The active filter at that comprises a main circuit with one or a series of fast switches for each phase. Each such switch preferably comprises a transistor, a diode and a protection circuit in the form of a so-called snubber. These switches are connected to a DC-link that can accumulate electrical energy. The power grid's current provision and the load's current consumption are measured periodically and using pulse width modulation the current direction for the transistor circuits are reversed in such a manner that the current provided by the active filter results in a current drawn from the power grid that is in phase with the voltage and liberated from disturbances. Said switches generally comprise so-called IGBTs, Insulated Gate Bipolar Transistor, but can also be realized with other transistor types, for example MOSFET. Preferably the aforementioned main circuit is connected to each of the three phases of the power grids using inductors. Further, for each phase connection a circuit breaker is preferably arranged between the active filter's main circuit and the phases.

At loads varying unevenly between the phases disturbances may leak to the electrical neutral line. A problem with the thereby generated so-called null currents is that they may become non-neglectable and thereby cause problems in other equipment.

In a simultaneously filed patent application by the inventors for the present application, this is solved by an active filter for compensation of variations in an apparatus's current consumption from a power grid as a cause of changes in the apparatus's electrical load, which filter comprises a switch arranged for reversal of the current direction connected between the neutral line in the power grid and a DC-link.

Each component in an electrical system that is not purely resistive will provide a complex impedance component, and therefore affect the system. The same of course applies to active components that result in dynamic variations of the current consumption. Thus the active filter will of course not only work to compensate undesired components in the system, it can also introduce disturbances.

One purpose with the present invention is to provide an active filter which, in relation to apparatuses and methods according to the state of the art, has an improved capacity to compensate for variations in an apparatus's current consumption from a power grid as a cause of variations in the apparatus's electrical behaviour, and which at the same time decreases the stress the active filter itself brings about on the power grid.

SUMMARY OF THE INVENTION

The present invention intends to, according to a first aspect, an active filter for compensation of variation in an apparatus current consumption as a cause of changes in the apparatus' electrical load through active frequency filtering and dynamic compensation of reactive energy/current. For each of the power grid's phases the active filter comprises a transistor bridge connected between each mentioned phase and a DC-link. According to the invention the active filter comprises a filter circuit arranged in order to reduce disturbances on the power grid generated by the active filter.

In an embodiment the active filter further comprises a control system which includes means to with a given working frequency calculate a point in time in order to reverse the current direction through said DC-link with said transistor bridges, and said filter circuit is preferably tuned in relation to said working frequency.

Said filter circuit is in an embodiment tuned to short-circuit harmonics and disturbances that are generated during current reversal with said transistor bridges.

The filter circuit is preferably passive.

In an embodiment said filter circuit is arranged between said transistor bridges and the point of common connection of the active filter to said phases.

Preferably said filter circuit is a T-filter of LCL-type that for each phase comprises two inductors and one capacitor. For each phase the capacitor is preferably connected with a first end between the two mentioned inductors, and with the other end to the corresponding other ends of the capacitors for the other phases.

In a preferred embodiment the active filter further comprises a separate transistor bridge for the neutral line, connected between the neutral line via a T-filter of LCL-type corresponding to the for the phases arranged T-filters, and connected in the corresponding way with its capacitor to the capacitors for the phases.

BRIEF DESCRIPTION OF THE DRAWINGS

A preferred embodiment is described in detail below with reference to the only FIG. 1, which schematically illustrates parts of the circuit design for an active filter according to the present invention.

DETAILED DESCRIPTION OF A PREFERRED EMBODIMENT

Figure 1:
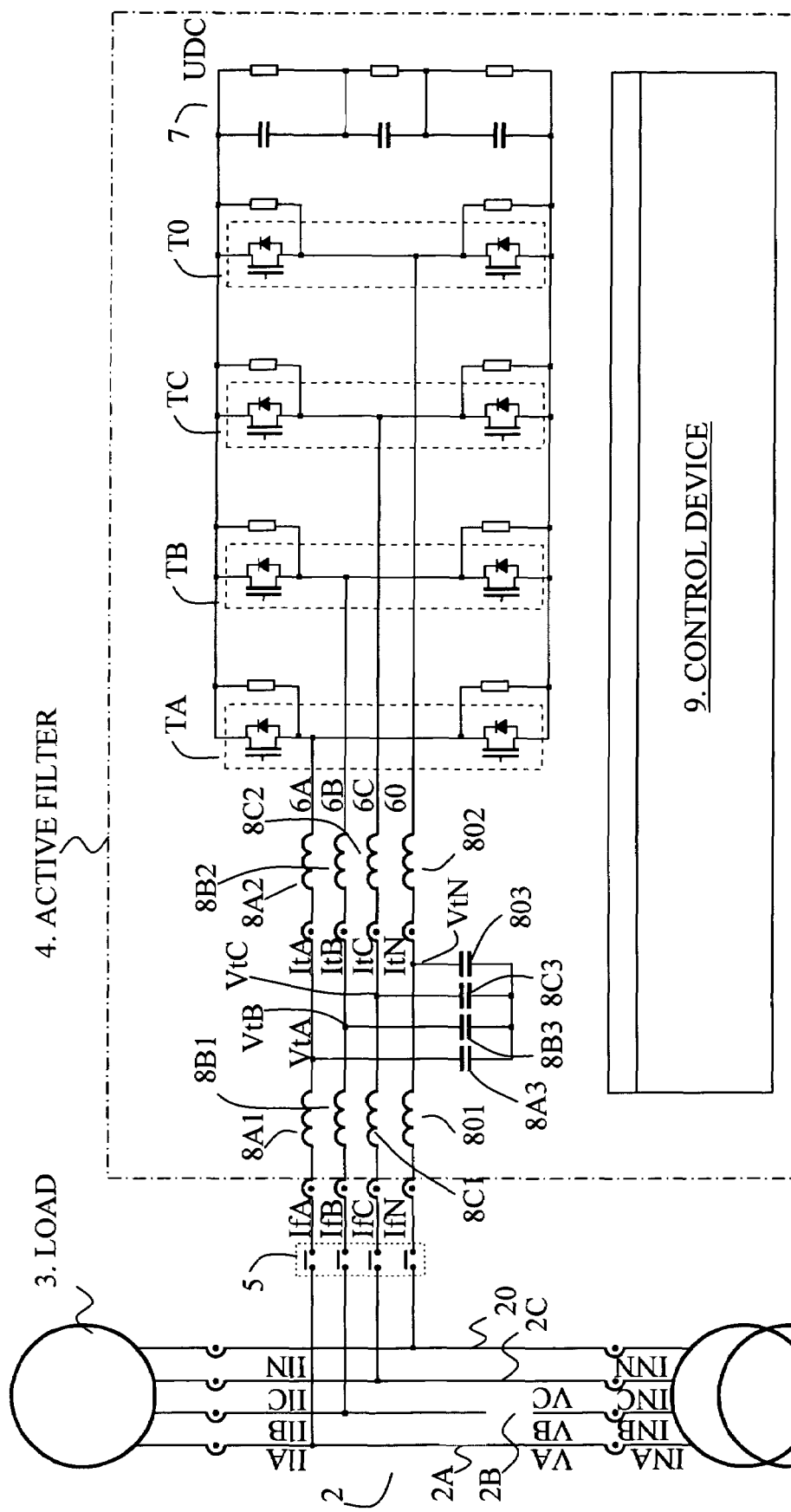

In FIG. 1 a preferred embodiment is schematically shown with the parts of a power supply device with an active filter relevant to the invention. A power grid 1 is via a connection 2 connected to an electrical apparatus 3. The power grid 1 is a three phase system with three phases a, b, c and neutral line 0, and the power supply connection 2 has separates conductors 2a, 2b, 2c for each phase and neutral line 20. Apparatus 3 comprises or constitutes preferably a load with dynamic impedance.

An active filter 4, indicated by the dotted and dashed line, comprises an electrical main circuit comprising transistor bridges Ta, Tb, Tc and T0 of pair-wise switches or transistor circuits TaU and TaD, TbU and TbD, TcU and TcD for each phase, and additionally a pair-wise switch or transistor-circuit T0U and T0D for the neutral line. The professional skilled within the known art however realizes that the all-embracing idea in the invention to compensate for disturbances generated by the active filter as well can be implemented in a system without neutral current compensation. U denotes here the in the figure upper switches and D the lower switches. Each transistor circuit TaU, TaD, TbU, TbD, TcU, TcD, T0U, T0D comprises a transistor with a diode and a snubber, connected in parallel with emitter and collector on the transistor. For each phase and for the neutral line the pair of transistor circuits are in one end connected to each other, and their other ends connected to opposite sides to one for all transistor circuits Ta, Tb, Tc, T0 common DC-link 7. The DC-link 7 comprises in the illustrated embodiment three series connected elements of each one capacitor and one resistor which are connected in parallel. The professional skilled within the known art will however realize that the specific design of the DC-link 7 is not decisive for the invention, and that a multitude of alternative arrangements for the DC-link are well known in the art. The DC-link 7 is accordingly connected in parallel with all transistor pairs or switches Ta, Tb, Tc, T0.

Via a conductor interface 5 with circuit breakers the active filter 4 is connectable to each conductor 2a, 2b, 2c, 20 in the power supply connection 2. For this purpose the active filter 4 is arranged with conductor connection 6 comprising separate conductors 6a, 6b, 6c 60 arranged in order to via line interface 5 connect each transistor pair Ta, Tb, Tc, T0 to a conductor 2a, 2b, 2c, 20 at said each ends of the transistor circuits.

A control device 9 in the active filter 4 further constitutes the filter's control system, and is arranged for control of the transistors in the filter. Said transistors are preferably constituted of IGBTs that can be activated very quickly, but can also be constituted of for example MOSFETs. The control device 9 encompasses a control computer with microprocessors in which the points in time for which the control pulses to the switches are calculated, the control pulses from which the switches are trigged. The current in the load 3, three phases and the neutral line, and the voltage in the power grid 1 is sampled into the control computer together with the DC-voltage in the link 7 and the current in the filter's three phases and neutral line. From the load currents the undesired frequency components are identified in a way well known in the art. These components, preferably represented in rotating coordinate systems, are used with reversed sign as reference value. The filter 4 produces then the same components as in the load 1 but with reversed sign, which gives measurement values. This make the load's and filter's components theoretically put out each other, and the compensation for the loads undesired behaviour in consumptions must no longer be supplied from the power grid but are supplied by the filter. For maintenance of the DC-link's 7 voltage there exists, integrated with remaining control, an addition in the control rules functions considering that said DC-links voltage must be maintained at a stable level in order for the filter to generate compensations currents in the different phases and the neutral line.

According to the present invention the connections 6a, 6b, 6c, 60 each comprises a passive filter 8 arranged between the conductors 2a, 2b, 2c, 20 and the active filter's main circuit with the transistor bridges Ta, Tb, Tc, T0. The filter 8 comprises for each line, in the illustrated embodiment both phases a, b, c and the neutral line 0 or n, one T-connection of LCL-type. Each T-connection thus comprises a first inductor 8a1, 8b1, 8c1, 801 and a second inductor 8a2, 8b2, 8c2, 802, connected in series between conductor 2a, 2b, 2c, 20 and transistor bridges Ta, Tb, Tc, T0. Each T-connection further comprises a capacitor 8a3, 8b3, 8c3, 803 connected between the series connected inductors and a point 84, which is common for all capacitors 8a3, 8b3, 8c3, 803. The T-filter for each line is thus completely passive which gives an advantageously simple construction. All inductors 8a1, 8b1, 8c1, 801, 8a2, 8b2, 8c2, 802 can have the same inductance L, and all capacitors preferably has the same capacitance C, but they can also differ which is well known in the art. Said inductance L and capacitance C are adjusted in order for the T-filter to short-circuit harmonics and disturbances which are generated in connection with the switching of transistor bridges Ta, Tb, Tc, T0, i.e., reversal of the current direction. This is realized by selecting L and C so that they correlate with the working frequency f of the active filter's automatic control cycle. The professional skilled within the known art realizes that this can be realized in a multitude of ways through a careful selection of L and C.

The control system which the control device 9 realizes has as in parameters voltage Va, Vb, Vc on the power grid's 1 lines 2a, 2b, 2c, as well as the load currents I1a, I1b, I1c, I1n and the filter currents Ifa, Ifb, Ifc, Ifn outside the T-filter on the phases a, b, c and the neutral line n or 0. Further the currents Ita, Itb, Itc, Itn are monitored between the inductors on each line, and are used as in parameters for the control system.

With help from the active filter according to the presented embodiment of the present invention will not only provide compensation of load changes occur on the phases a, b, c, and potentially the neutral line 0/n, caused by the behaviour of the load, but also the active filter's influence on the power supply grid. This results in a more efficient and purer compensation of the to the power supply grid connected load.

Distinctive features for the invention above have been described with help of an example of an embodiment. The professional skilled within the known art however realizes that modifications of said embodiment can be made within the frames that are defined by the enclosed patent claims.

The invention claimed is:

1. Active filter for compensating variations in an apparatus' current consumption from a power grid as a result of variations in the apparatus' electrical load, which for each of the power grid's phases has a transistor bridge connected between each said phase and a DC-link, which active filter comprises a filter circuit devised to reduce disturbances generated by the active filter itself on the power supply grid, wherein the filter circuit comprises, for each phase, a passive T-filter of LCL type connected between said transistor bridges and a power grid connection point of the active filter to said phases and wherein the T-filter of LCL type has two series-connected inductors and one capacitor with the capacitor connected between the two inductors and connected to the capacitor of every other T-filter of LCL type in a T-connection.

2. The active filter according to claim 1, which further comprises a control system including means for calculating, with a working frequency, points in time for said transistor bridges to reverse the current direction through said DC-link, where said filter circuit is tuned in relation to said working frequency.

3. The active filter according to claim 2, where said filter circuit is tuned to short-circuit harmonics and disturbances generated at current reversal with said transistor bridges.

4. The active filter according to claim 1, which further comprises a separate transistor bridge for the neutral, connected to the neutral line via the T-filter of LCL-type corresponding to the T-filters arranged for the phases.

5. The active filter according to claim 2, comprising means for monitoring the current between the inductors of the LCL type filter for each phase, wherein the control system is devised to use said currents as parameters for controlling the transistor bridges.

6. An active filter arrangement for a power supply grid having a plurality of phases comprising:
   active filter circuitry connected in parallel between the power grid and a load connected to the power grid, the active filter circuitry comprising a plurality of filter bridges and a DC-link with each one of the filter bridges connected between each one of the plurality of phases of the power supply grid and the DC-link;
   passive filter circuitry that filters the active filter circuitry that is connected in series between the active filter circuitry and the power supply grid and load, the passive filter circuitry comprising a passive filter for each one of the plurality of phases that has a capacitor connected between a pair of series-connected inductors and to the capacitor of every other passive filter of every other one of the plurality of phases in a T-connection; and
   an active filter controller.

7. The active filter arrangement according to claim 6, wherein the power supply grid is a three phase power supply grid, and each filter bridge comprises a transistor bridge wherein the inductors of each one of the passive filters have the same inductance and each capacitor of each one of the passive filters has the same capacitance.

8. The active filter arrangement according to claim 6, wherein the power supply grid is a three phase power supply grid, each filter bridge includes a first transistor bridge connected to one side of the DC-link and a second transistor bridge connected to the other side of the DC-link.

9. The active filter arrangement according to claim 8, wherein each transistor bridge comprises a transistor in parallel with a diode and a snubber.

10. The active filter arrangement according to claim 8, wherein the DC-link comprises a plurality of resistors connected in series and a plurality of capacitors connected in series with each resistor connected in parallel to a corresponding one of the capacitors.

11. The active filter arrangement according to claim 6, wherein each one the inductors of each passive filter has the same inductance, and the inductance and capacitance of the capacitor of each passive filter is selected to correlate with a working frequency of an automatic control cycle of the active filter circuitry.

12. An active filter arrangement for a power supply grid having a plurality of phases comprising:
   active filter circuitry connected in parallel between the power grid and a load connected to the power grid, the active filter circuitry comprising a plurality of transistor bridges that each has a transistor and a DC-link with each one of the transistor bridges connected between each one of the plurality of phases of the power supply grid and the DC-link;
   filter circuitry that compensates for electrical power disturbances generated during switching of transistor bridges of the active filter circuitry, the filter circuitry connected in series between the active filter circuitry and the power supply grid and load, the filter circuitry comprising an LCL filter for each one of the plurality of phases with each LCL filter connected in series between one of the transistor bridges of the active filtering circuitry and a corresponding one of the power supply grid phases, and wherein each LCL filter includes a plurality of inductors connected in series and a capacitor connected thereto in between the series-connected inductors and connected to every other capacity of every other LCL filter in a T-connection; and
   a filter controller that controls transistor bridge switching.

* * * * *